US012410742B1

(12) United States Patent
Liao

(10) Patent No.: US 12,410,742 B1
(45) Date of Patent: Sep. 9, 2025

(54) LIQUID FILLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 38 days.

(21) Appl. No.: 18/595,613

(22) Filed: Mar. 5, 2024

(51) Int. Cl.
*F01P 11/02* (2006.01)
*B67C 11/04* (2006.01)
*B67C 11/00* (2006.01)

(52) U.S. Cl.
CPC ........... *F01P 11/0276* (2013.01); *B67C 11/04* (2013.01); *B67C 2011/30* (2013.01); *Y10T 137/3109* (2015.04)

(58) Field of Classification Search
CPC ..... B67C 3/16; B60K 15/04; Y10T 137/3109; F01P 11/0276
See application file for complete search history.

(56) References Cited

U.S. PATENT DOCUMENTS

| | | | | |
|---|---|---|---|---|
| 5,069,062 A * | 12/1991 | Malecek | G01M 3/3227 73/49.7 |
| 7,591,289 B1 * | 9/2009 | Hamada | F01P 11/028 141/94 |
| 9,115,636 B2 * | 8/2015 | Allen | F01P 11/0204 |

* cited by examiner

*Primary Examiner* — Timothy P. Kelly
(74) *Attorney, Agent, or Firm* — MUNCY, GEISSLER, OLDS & LOWE, P.C.

(57) ABSTRACT

A liquid filling device is provided, including: a base, a connecting assembly, a pressure gauge, at least one filling assembly and a negative pressure generator. The base includes a channel, and the channel extends through the base and includes at least one liquid inlet, a first gas port, a second gas port, an assembling opening and a measuring port. The negative pressure generator includes a tube body and a venturi structure, and the tube body is disposed through the base and includes a penetrating portion disposed through the channel. The penetrating portion has at least one through hole, and the venturi structure is received within the penetrating portion and communicated with the channel. When a gas is passed through the venturi structure, a negative pressure is generated to extract a gas in the container to be filled.

10 Claims, 9 Drawing Sheets

LIQUID FILLING DEVICE

BACKGROUND OF THE INVENTION

Field of the Invention

The present invention relates to a liquid filling device.

Description of the Prior Art

A vehicle engine is cooled by exchanging heat with the liquid in a water tank. After the vehicle has been used for a period of time, the water tank needs to be filled with liquid. To avoid air remaining in the water tank, the vehicle is started for a period of time to discharge the air in the water tank during filling process. In other way, when the water tank is almost full, the water tank is connected with a pipe communicated with an air extractor to discharge the air in the water tank, after that, an end of the pipe connected to the air extractor is detached from the air extractor and placed into a bucket with the liquid so as to fill the water tank.

However, the filling process as described above has to be performed by experienced operators, or air is easy to enter the water tank when the pipe is removed from the air extractor. In addition, the liquid is easy to overflow from the pipe when the pipe is detached from the water tank after filling, which results in a humid and messy working environment.

The present invention is, therefore, arisen to obviate or at least mitigate the above-mentioned disadvantages.

SUMMARY OF THE INVENTION

The main object of the present invention is to provide a liquid filling device with a simple structure and a small volume, which can quickly and directly extract the air in a container to be filled.

To achieve the above and other objects, the present invention provides a liquid filling device, including: a base, a connecting assembly, a pressure gauge, at least one filling assembly and a negative pressure generator. The base includes a channel, and the channel extends through the base and includes at least one liquid inlet, a first gas port, a second gas port, an assembling opening and a measuring port. The connecting assembly is disposed on the base and communicated with the channel via the assembling opening, and the connecting assembly is configured to be connected with a container to be filled and communicated with an interior of the container to be filled. The pressure gauge is assembled to the base and communicated with the channel via the measuring port, and the pressure gauge is configured to measure a pressure in the container to be filled. The at least one filling assembly is assembled to the base and communicated with the channel via the at least one liquid inlet, and the at least one filling assembly is configured to introduce a liquid into the container to be filled. The negative pressure generator includes a tube body and a venturi structure, and the tube body is disposed through the base via the first gas port and the second gas port. The tube body includes a first gas guiding portion, a penetrating portion and a second gas guiding portion which are communicatedly connected with one another in sequence. The first gas guiding portion protrudes beyond the first gas port, the penetrating portion is disposed through the channel, and the second gas guiding portion protrudes beyond the second gas port. The penetrating portion has at least one through hole disposed therethrough, and the venturi structure is received within an interior of the penetrating portion and communicated with the channel via the at least one through hole. When a gas is provided in the tube body and passed through the venturi structure, a negative pressure is generated to extract a gas in the container to be filled.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
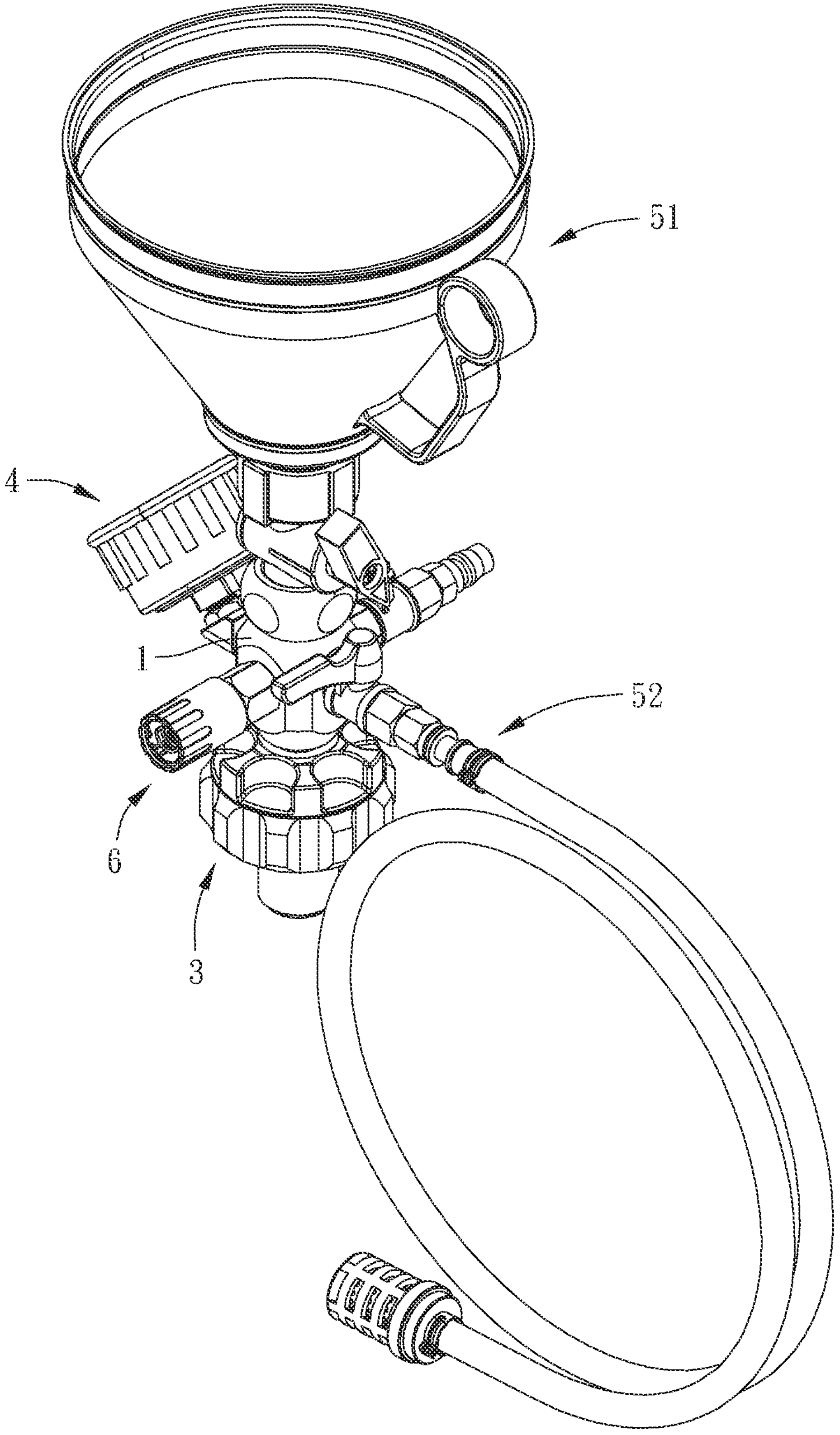
FIG. 1 is a stereogram of a preferable embodiment of the present invention.
Figure 2:
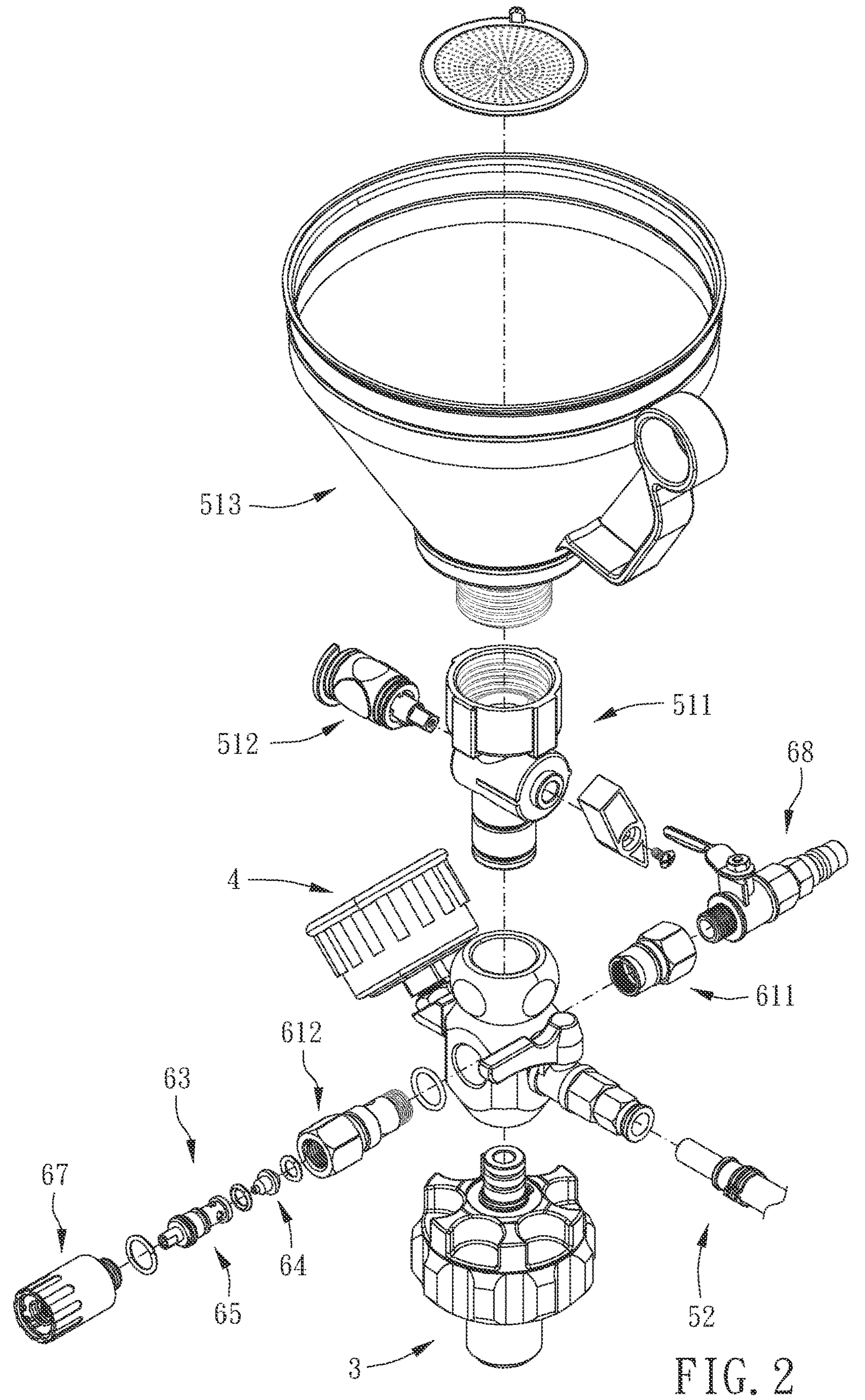
FIG. 2 is a breakdown drawing of FIG. 1.
Figure 3:
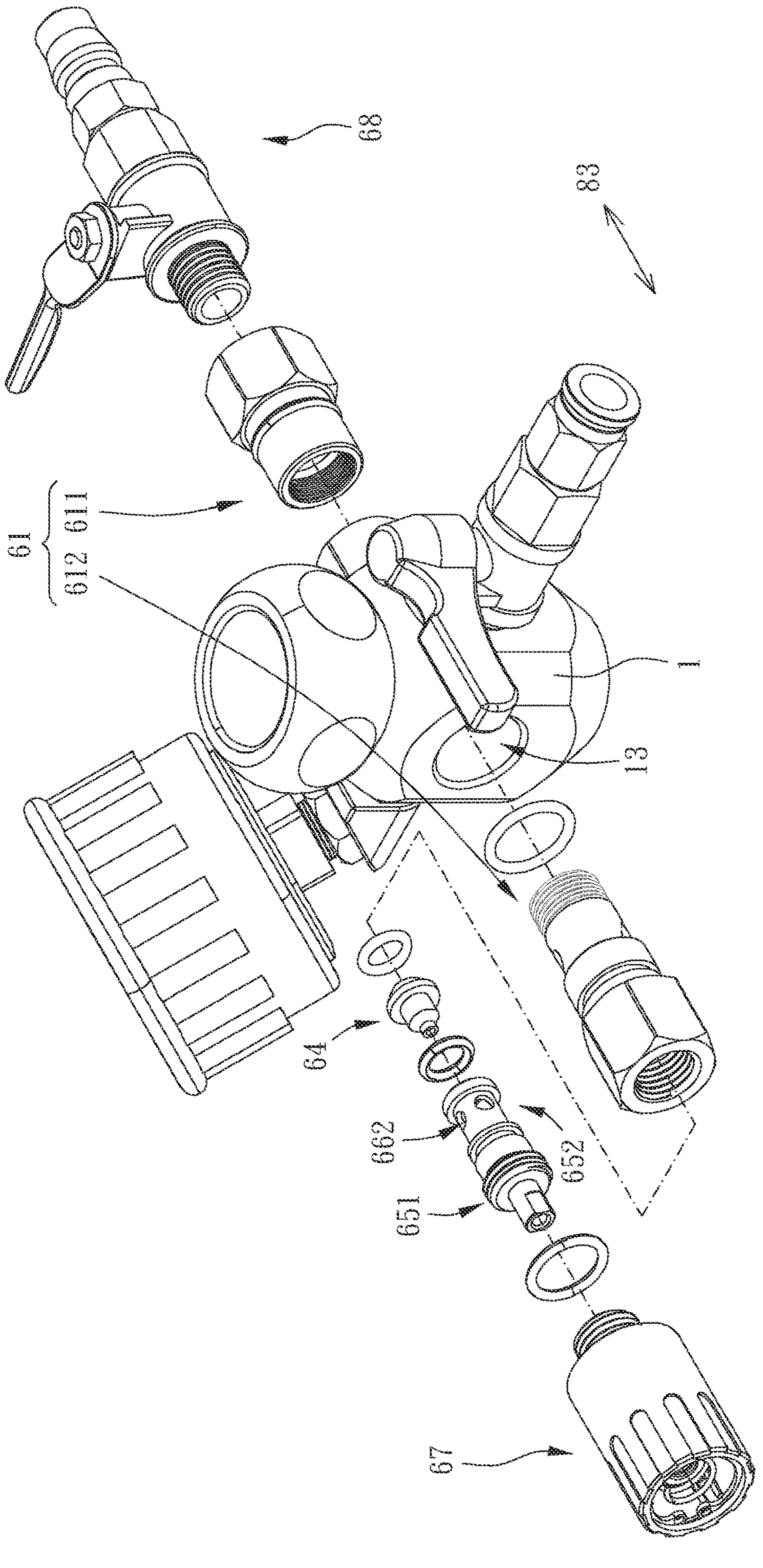
FIG. 3 is a breakdown drawing of a base and a negative pressure generator according to a preferable embodiment of the present invention.
Figure 4:
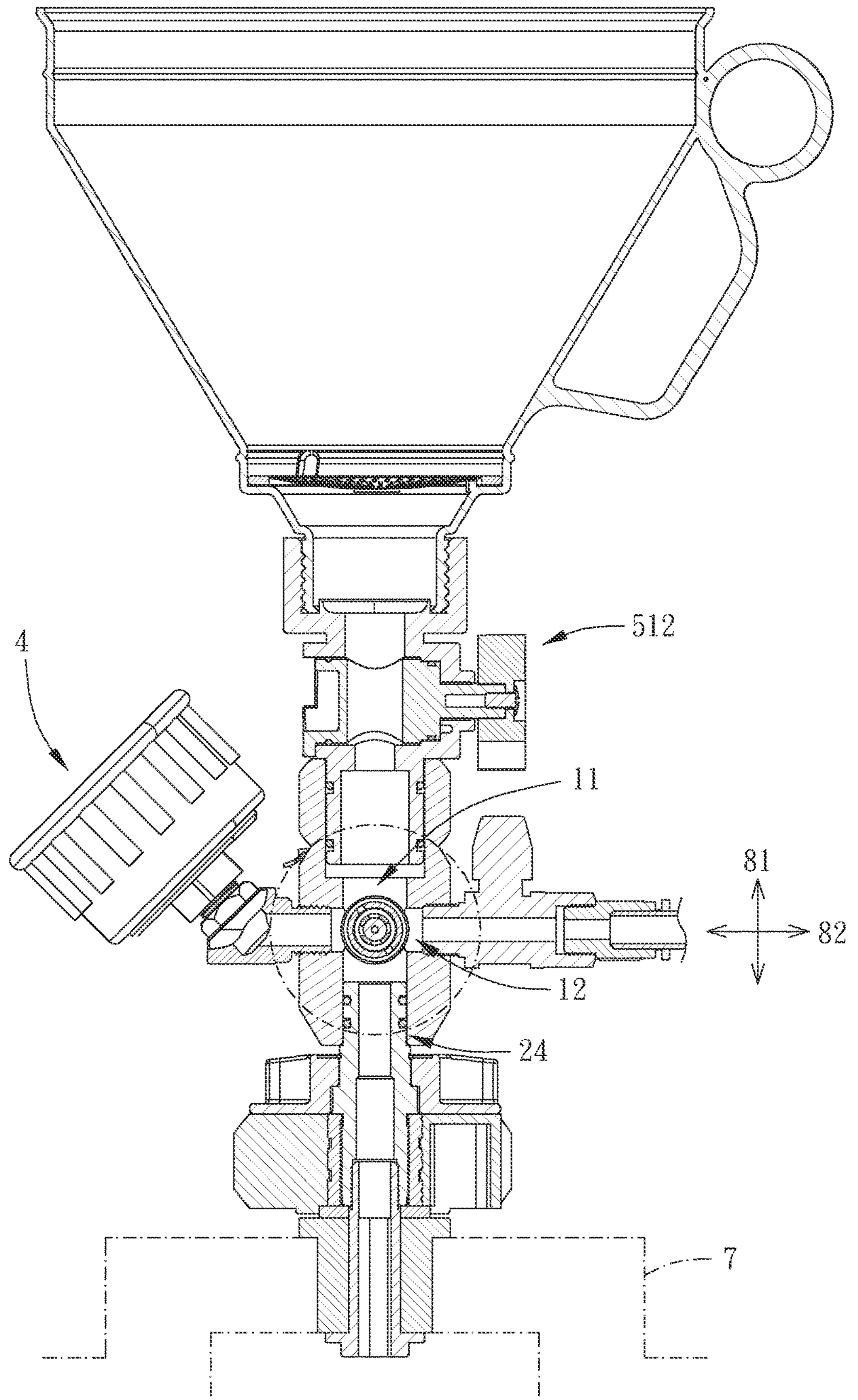
FIG. 4 is a partial cross-sectional view as viewed in a third direction according to a preferable embodiment of the present invention.
Figure 5:
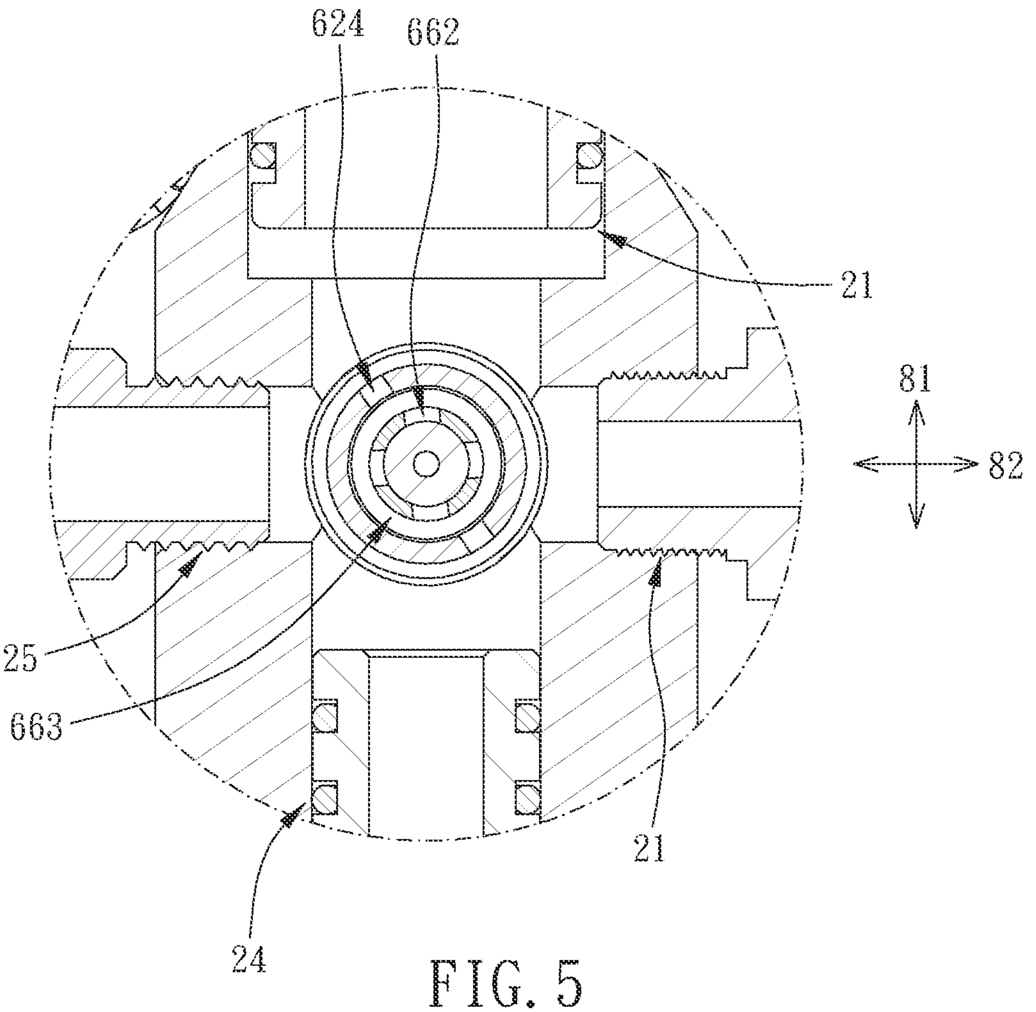
FIG. 5 is an enlargement of FIG. 4.
Figure 6:
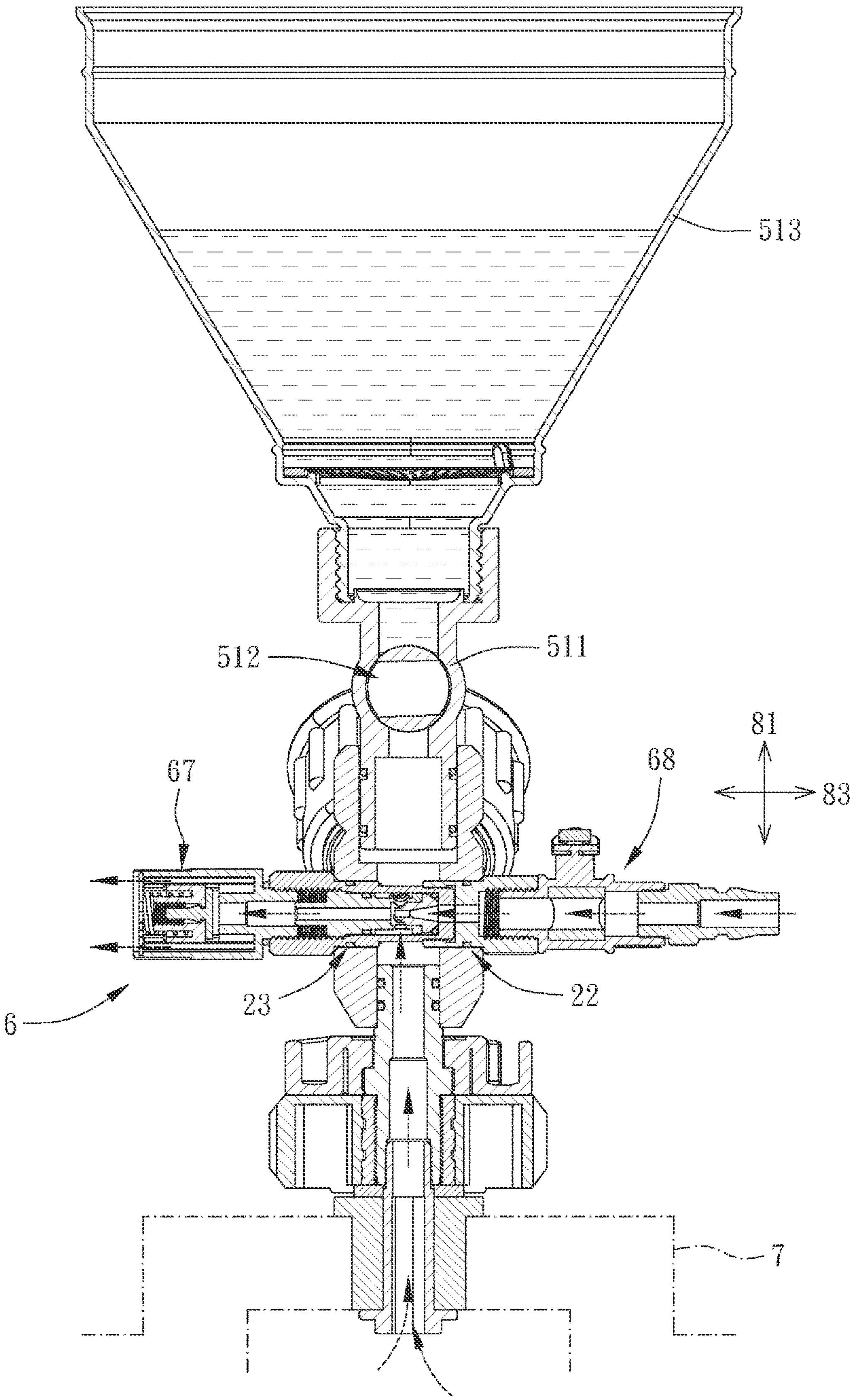
FIG. 6 is a cross-sectional view of as viewed in a second direction according to a preferable embodiment of the present invention when a funnel switch is closed.
Figure 7:
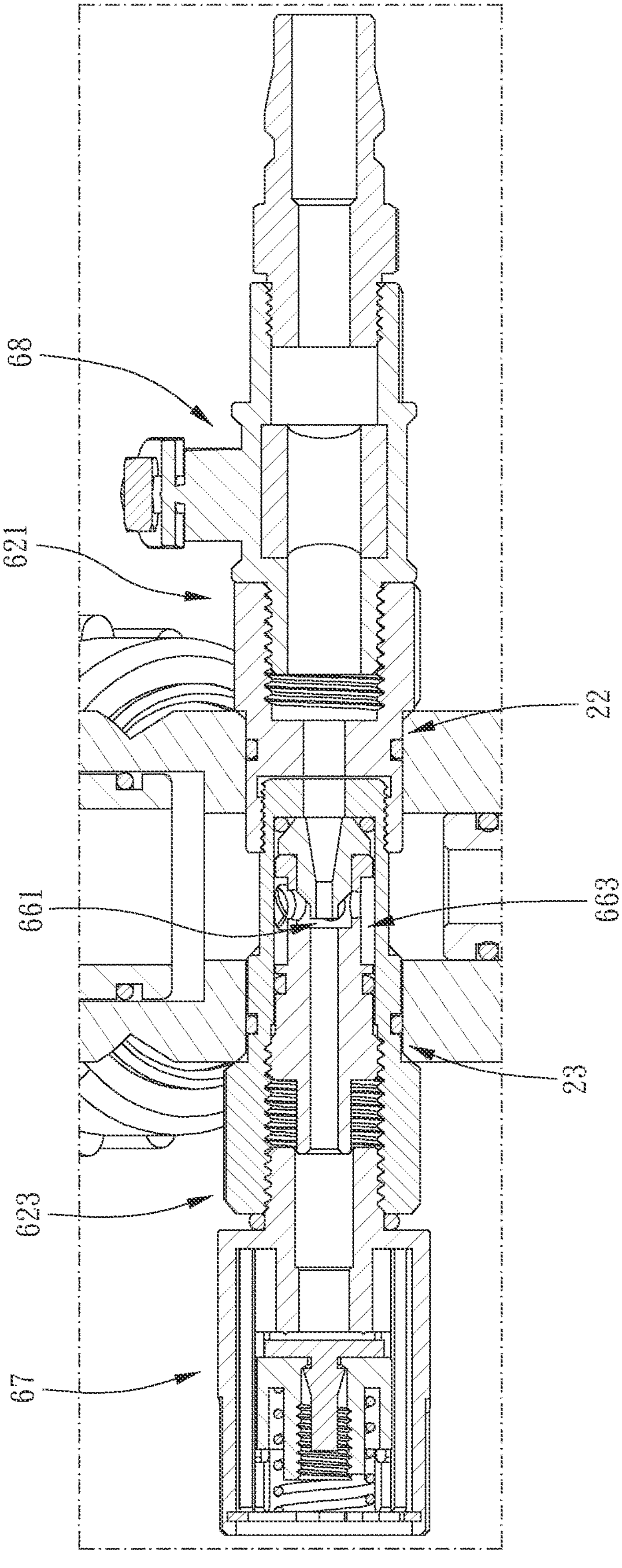
FIG. 7 is an enlargement of FIG. 6.
Figure 8:
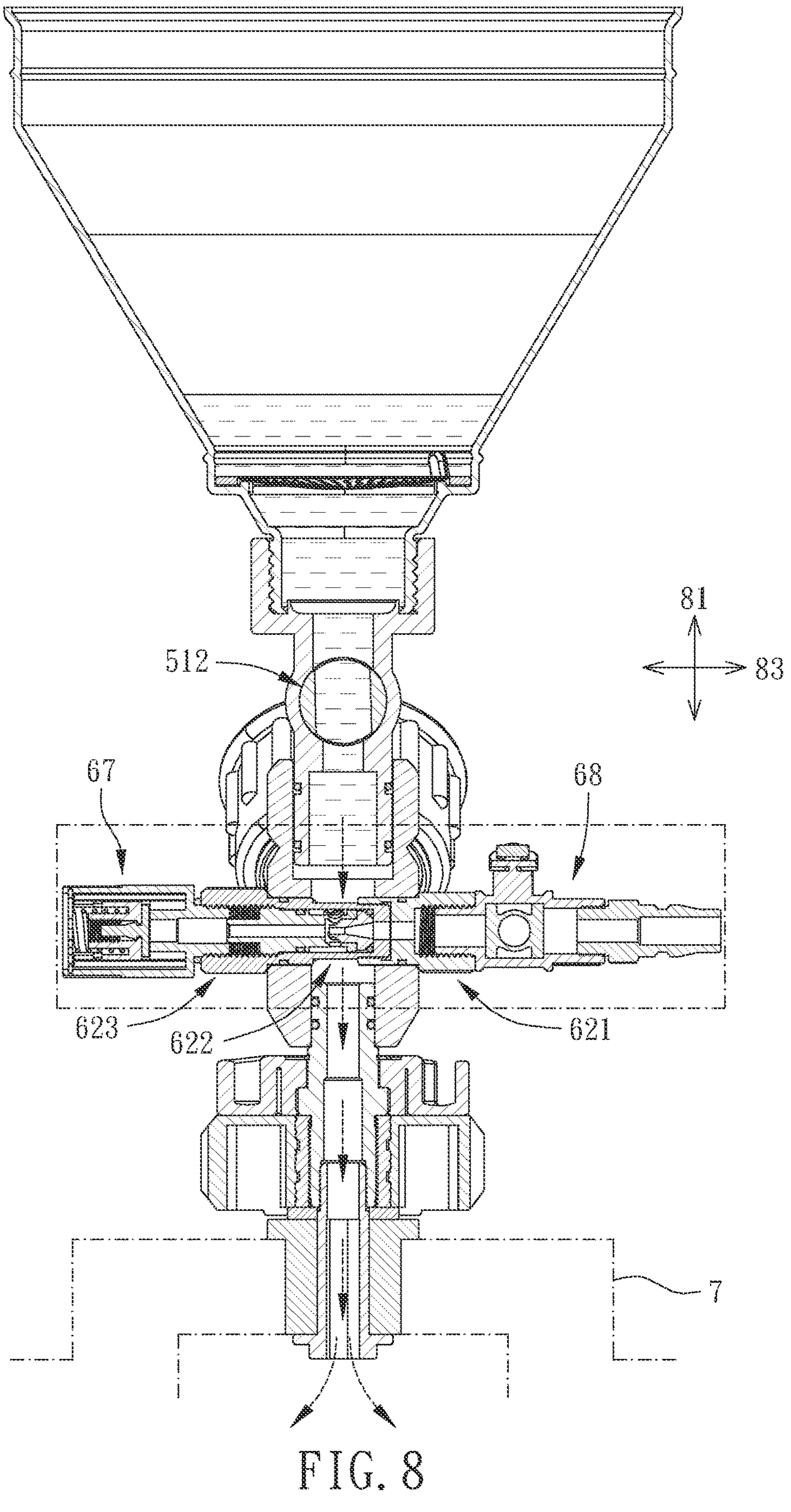
FIG. 8 is a cross-sectional view of as viewed in the second direction according to a preferable embodiment of the present invention when the funnel switch is opened.
Figure 9:
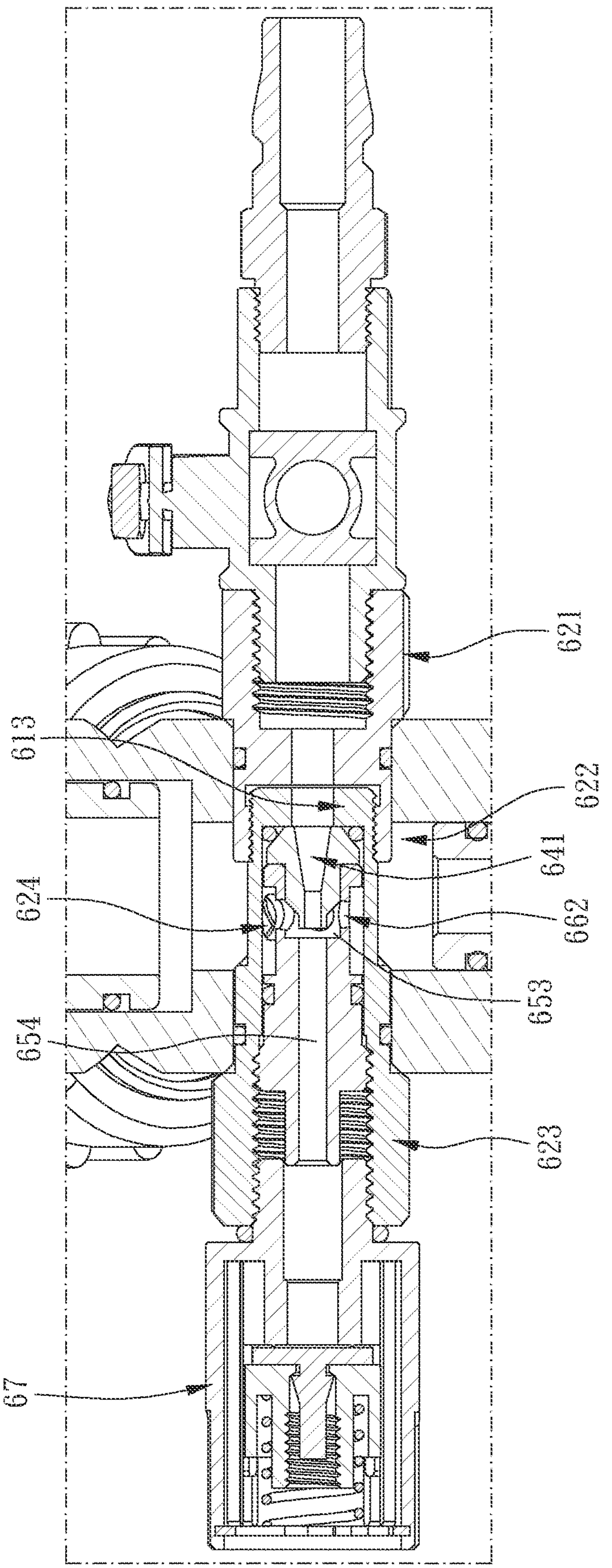
FIG. 9 is an enlargement of FIG. 8.

Please refer to FIGS. 1 to 9 for a preferable embodiment of the present invention. A liquid filling device of the present invention includes a base 1, a connecting assembly 3, a pressure gauge 4, at least one filling assembly and a negative pressure generator 6.

The base 1 includes a channel, and the channel extends through the base 1 and includes at least one liquid inlet 21, a first gas port 22, a second gas port 23, an assembling opening 24 and a measuring port 25. The connecting assembly 3 is disposed on the base 1 and communicated with the channel via the assembling opening 24, and the connecting assembly 3 is configured to be connected with a container 7 to be filled (such as a vehicle water tank) and communicated with an interior of the container 7 to be filled. The connecting assembly 3 is detachably and insertedly disposed within the assembling opening 24. The pressure gauge 4 is assembled to the base 1 and communicated with the channel via the measuring port 25, and the pressure gauge 4 is configured to measure a pressure in the container 7 to be filled.

The at least one filling assembly is assembled to the base 1 and communicated with the channel via the at least one liquid inlet 21, and the at least one filling assembly is configured to introduce a liquid into the container 7 to be filled. Moreover, the channel includes two said liquid inlets 21, and the at least one filling assembly includes a funnel unit 51 and a filling tube 52. The funnel unit 51 is disposed on the base 1 and communicated with one of the two said liquid inlets 21, and the filling tube 52 is disposed on the base 1 and communicated with the other of the two said liquid inlets 21. The funnel unit 51 includes a seat 511, a funnel switch 512 and a funnel container 513, and the seat

511 is detachably and insertedly disposed within one of the two said liquid inlets 21, and the funnel container 513 and the funnel switch 512 are disposed on the seat 511. The funnel switch 512 is located between one of the two said liquid inlets 21 and the funnel container 513, and the funnel switch 512 is controllable to change fluid communication between the funnel container 513 and the one of the two said liquid inlets 21.

The negative pressure generator 6 includes a tube body 61 and a venturi structure 63, and the tube body 61 is disposed through the base 1 via the first gas port 22 and the second gas port 23. The tube body 61 includes a first gas guiding portion 621, a penetrating portion 622 and a second gas guiding portion 623 which are communicatedly connected with one another in sequence. The first gas guiding portion 621 protrudes beyond the first gas port 22, the penetrating portion 622 is disposed through the channel, and the second gas guiding portion 623 protrudes beyond the second gas port 23. The penetrating portion 622 has at least one through hole 624 disposed therethrough, and the venturi structure 63 is received within an interior of the penetrating portion 622 and communicated with the channel via the at least one through hole 624. When a gas is provided in the tube body 61 and passed through the venturi structure 63, a negative pressure is generated to extract a gas in the container 7 to be filled.

With the structures as described above, a portion of the negative pressure generator 6 is arranged in the channel, which effectively utilizes the space of the channel and reduces a volume of the negative pressure generator 6 out of the base 1. Moreover, the venturi structure 63 is entirely located in the channel so that the base 1 protects the venturi structure 63 from external interference, and the venturi structure 63 can quickly and directly extract the gas in the container 7 to be filled.

In this embodiment, the channel further includes a first pathway 11, a second pathway 12 and a third pathway 13. The first pathway 11 extends through the base 1 in a first direction 81 to form one of the two said liquid inlets 21 and the assembling opening 24, and the funnel unit 51 is disposed within one of the two said liquid inlets 21 in the first direction 81. The second pathway 12 extends through the base 1 in a second direction 82 to form the other of the two said liquid inlets 21 and the measuring port 25, and the filling tube 52 is disposed within one of the two said liquid inlets 21 in the second direction 82. The third pathway 13 extends through the base 1 in a third direction 83 to form the first gas port 22 and the second gas port 23. The first direction 81, the second direction 82 and the third direction 83 are vertical to one another. In operation, the first direction 81 is a direction of gravity, and the venturi structure 63 is at least partially located at an intersection of the first pathway 11, the second pathway 12 and the third pathway 13 so as to have good suction efficiency.

The first gas guiding portion 621 is configured to be communicated with a gas driving device (such as an inflator or air extractor), and the negative pressure generator 6 further includes a gas switch 68. The gas switch 68 is disposed on the first gas guiding portion 621 and located between the gas driving device and the venturi structure 63, and the gas switch 68 is configured to change fluid communication between the gas driving device and the venturi structure 63 so as to control an operation time of the negative pressure generator 6.

In this embodiment, the gas driving device is an inflator, and the negative pressure generator 6 further includes a one-way valve assembly 67. The one-way valve assembly 67 is disposed on the second gas guiding portion 623 so as to control the gas to flow into the venturi structure 63 in a direction from the first gas guiding portion 621 to the second gas guiding portion 623.

Furthermore, the tube body 61 further includes a first tube member 611 and a second tube member 612, and the first tube member 611 and the second tube member 612 are respectively insertedly disposed within the first gas port 22 and the second gas port 23 and screwingly connected with each other in the channel. The first tube member 611 and the second tube member 612 are screwed with each other and restrict the base 1 therebetween. A portion of the first tube member 611 protruding beyond the first gas port 22 is the first gas guiding portion 621, a portion of the second tube member 612 protruding beyond the second gas port 23 is the second gas guiding portion 623, and portions of the first tube member 611 and the second tube member 612 located within the channel define the penetrating portion 622.

The tube body 61 further includes an inner projection 613, and the inner projection 613 is protrudingly disposed in the tube body 61. The venturi structure 63 includes a main body 64 and a positioning tube 65, and the main body 64 is received within the tube body 61 and abutted against the inner projection 613. The positioning tube 65 includes a threaded segment 651 and an abutted segment 652 connected with each other, and the threaded segment 651 is screwed to an inner wall of the tube body 61. The abutted segment 652 and the inner projection 613 restrict the main body 64 therebetween. A diametrical dimension of the abutted segment 652 is smaller than a diametrical dimension of the threaded segment 651, and the abutted segment 652 and the tube body 61 define a chamber 663 therebetween. The abutted segment 652 has at least one intake 662 radially disposed therethrough, and the chamber 663 communicates the at least one through hole 624 with the at least one intake 662. The threaded segment 651 has a first gas passage 653 axially disposed therethrough, and the abutted segment 652 has a second gas passage 654 axially disposed therethrough. The second gas passage 654 is communicated with the first gas passage 653, and a diametrical dimension of the second gas passage 654 is larger than a diametrical dimension of the first gas passage 653. A portion of the main body 64 is insertedly disposed within the second gas passage 654 and defines a mixing space 661, and the mixing space 661 is communicated with the at least one intake 662. The main body 64 has a passageway 641 disposed therethrough, and the passageway 641 is communicated with the mixing space 661 and is tapered in a direction toward the second gas passage 654.

When a gas flows through the passageway 641, a negative pressure is generated at the at least one intake 662. The gas in the channel is drawn into the mixing space 661 through the at least one through hole 624 and the chamber 663 and flows to the one-way valve assembly 67 along the first gas passage 653, and then to an external environment. The at least one through hole 624, the at least one intake 662, the chamber 663 and the mixing space 661 are located at the intersection of the first pathway 11, the second pathway 12 and the third pathway 13.

A number of the at least one intake 662 is larger than a number of the at least one through hole 624. In this embodiment, a number of the at least one through hole 624 is two, and a number of the at least one intake 662 is four. Two said through holes 624 are arranged equiangularly, and four said intakes 662 are arranged equiangularly. A sum of cross-sectional areas of the four said intakes 662 is larger than a sum of cross-sectional areas of the two said through holes

624, which facilitates to extract the gas in the chamber 663 from different directions through the four said intakes 662.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A liquid filling device, including:

a base, including a channel, the channel extending through the base and including at least one liquid inlet, a first gas port, a second gas port, an assembling opening and a measuring port;

a connecting assembly, disposed on the base and communicated with the channel via the assembling opening, configured to be connected with a container to be filled and communicated with an interior of the container to be filled;

a pressure gauge, assembled to the base and communicated with the channel via the measuring port, configured to measure a pressure in the container to be filled;

at least one filling assembly, assembled to the base and communicated with the channel via the at least one liquid inlet, configured to introduce a liquid into the container to be filled; and a negative pressure generator, including a tube body and a venturi structure, the tube body disposed through the base via the first gas port and the second gas port, the tube body including a first gas guiding portion, a penetrating portion and a second gas guiding portion which are communicatedly connected with one another in sequence, the first gas guiding portion protruding beyond the first gas port, the penetrating portion disposed through the channel, the second gas guiding portion protruding beyond the second gas port, the penetrating portion having at least one through hole disposed therethrough, the venturi structure received within an interior of the penetrating portion and communicated with the channel via the at least one through hole; wherein when a gas is provided in the tube body and passed through the venturi structure, a negative pressure is generated to extract a gas in the container to be filled.

2. The liquid filling device of claim 1, wherein the channel defines two said liquid inlets, the at least one filling assembly includes a funnel unit and a filling tube, the funnel unit is disposed on the base and communicated with one of the two said liquid inlets, and the filling tube is disposed on the base and communicated with the other of the two said liquid inlets.

3. The liquid filling device of claim 2, wherein the funnel unit includes a seat, a funnel switch and a funnel container, the seat is detachably and insertedly disposed within one of the two said liquid inlets, the funnel container and the funnel switch are disposed on the seat, the funnel switch is located between one of the two said liquid inlets and the funnel container, and the funnel switch is controllable to change fluid communication between the funnel container and one of the two said liquid inlets.

4. The liquid filling device of claim 2, wherein the channel includes a first pathway, a second pathway and a third pathway, the first pathway extends through the base in a first direction to form one of the two said liquid inlets and the assembling opening, the second pathway extends through the base in a second direction to form the other of the two said liquid inlets and the measuring port, the third pathway extends through the base in a third direction to form the first gas port and the second gas port; wherein the first direction, the second direction and the third direction are vertical to one another, and the venturi structure is at least partially located at an intersection of the first pathway, the second pathway and the third pathway.

5. The liquid filling device of claim 1, wherein the connecting assembly is detachably and insertedly disposed within the assembling opening.

6. The liquid filling device of claim 1, wherein the negative pressure generator further includes a one-way valve assembly, and the one-way valve assembly is disposed on the second gas guiding portion.

7. The liquid filling device of claim 1, wherein the first gas guiding portion is configured to be communicated with a gas driving device, the negative pressure generator further includes a gas switch, the gas switch is disposed on the first gas guiding portion and located between the gas driving device and the venturi structure, and the gas switch is configured to change fluid communication between the gas driving device and the venturi structure.

8. The liquid filling device of claim 1, wherein the tube body further includes a first tube member and a second tube member, the first tube member and the second tube member are respectively insertedly disposed within the first gas port and the second gas port and screwingly connected with each other in the channel; a portion of the first tube member protruding beyond the first gas port is the first gas guiding portion, a portion of the second tube member protruding beyond the second gas port is the second gas guiding portion, and portions of the first tube member and the second tube member located within the channel define the penetrating portion.

9. The liquid filling device of claim 8, wherein the tube body further includes an inner projection, the inner projection is protrudingly disposed in the tube body, the venturi structure includes a main body and a positioning tube, the main body is received within the tube body and abutted against the inner projection, the positioning tube includes a threaded segment and an abutted segment connected with each other, the threaded segment is screwed to an inner wall of the tube body, the abutted segment and the inner projection restrict the main body therebetween, a diametrical dimension of the abutted segment is smaller than a diametrical dimension of the threaded segment, and the abutted segment and the tube body define a chamber therebetween, the abutted segment has at least one intake disposed therethrough, the chamber communicates the at least one through hole with the at least one intake, the threaded segment has a first gas passage disposed therethrough, the abutted segment has a second gas passage disposed therethrough, the second gas passage is communicated with the first gas passage, a diametrical dimension of the second gas passage is larger than a diametrical dimension of the first gas passage, a portion of the main body is insertedly disposed within the second gas passage and defines a mixing space, the mixing space is communicated with the at least one intake, the main body has a passageway disposed therethrough, and the passageway is communicated with the mixing space and is tapered in a direction toward the second gas passage.

10. The liquid filling device of claim 3, wherein the channel includes a first pathway, a second pathway and a third pathway, the first pathway extends through the base in a first direction to form one of the two said liquid inlets and the assembling opening, the second pathway extends through the base in a second direction to form the other of the two said liquid inlets and the measuring port, the third pathway extends through the base in a third direction to form the first gas port and the second gas port; wherein the first direction, the second direction and the third direction are vertical to one another, and the venturi structure is at least partially located at an intersection of the first pathway, the second pathway and the third pathway; the connecting assembly is detachably and insertedly disposed within the assembling opening; the negative pressure generator further includes a one-way valve assembly, and the one-way valve assembly is disposed on the second gas guiding portion; the first gas guiding portion is configured to be communicated with a gas driving device, the negative pressure generator further includes a gas switch, the gas switch is disposed on the first gas guiding portion and located between the gas driving device and the venturi structure, and the gas switch is configured to change fluid communication between the gas driving device and the venturi structure; the tube body further includes a first tube member and a second tube member, the first tube member and the second tube member are respectively insertedly disposed within the first gas port and the second gas port and screwingly connected with each other in the channel; a portion of the first tube member protruding beyond the first gas port is the first gas guiding portion, a portion of the second tube member protruding beyond the second gas port is the second gas guiding portion, and portions of the first tube member and the second tube member located within the channel define the penetrating portion; the tube body further includes an inner projection, the inner projection is protrudingly disposed in the tube body, the venturi structure includes a main body and a positioning tube, the main body is received within the tube body and abutted against the inner projection, the positioning tube includes a threaded segment and an abutted segment connected with each other, the threaded segment is screwed to an inner wall of the tube body, the abutted segment and the inner projection restrict the main body therebetween, a diametrical dimension of the abutted segment is smaller than a diametrical dimension of the threaded segment, and the abutted segment and the tube body define a chamber therebetween, the abutted segment has at least one intake disposed therethrough, the chamber communicates the at least one through hole with the at least one intake, the threaded segment has a first gas passage disposed therethrough, the abutted segment has a second gas passage therethrough, the second gas passage is communicated with the first gas passage, a diametrical dimension of the second gas passage is larger than a diametrical dimension of the first gas passage, a portion of the main body is insertedly disposed within the second gas passage and defines a mixing space, the mixing space is communicated with the at least one intake, the main body has a passageway disposed therethrough, and the passageway is communicated with the mixing space and is tapered in a direction toward the second gas passage; the at least one through hole, the at least one intake, the chamber and the mixing space are located at the intersection of the first pathway, the second pathway and the third pathway; the funnel unit is disposed within one of the two said liquid inlets in the first direction, and the filling tube is disposed within the other of the two said liquid inlets in the second direction; the first tube member and the second tube member are screwed with each other and restrict the base therebetween; a number of the at least one through hole is two, a number of the at least one intake is four, two said through holes are arranged equiangularly, four said intakes are arranged equiangularly, and a sum of cross-sectional areas of the four said intakes is larger than a sum of cross-sectional areas of the two said through holes.

* * * * *